United States Patent Office 3,495,665
Patented Feb. 17, 1970

3,495,665
WELL SERVICING METHODS UTILIZING A FOAMED HYDROPHOBIC LIQUID
John Kelly, Jr., Arlington, and Elmo M. Blount, Irving, Tex., assignors to Mobil Oil Corporation, a corporation of New York
No Drawing. Filed Sept. 15, 1967, Ser. No. 668,182
Int. Cl. E21b 21/04, 33/13; E21c 7/06
U.S. Cl. 175—69                                7 Claims

ABSTRACT OF THE DISCLOSURE

This specification discloses a pneumatic drilling process in which a foam of a hydrophobic liquid containing an oil-wetting surfactant is entrained in the gaseous drilling fluid. The foam is carried by the drilling fluid into contact with the wall of the well and renders it resistant to the deleterious effects of water which may be encountered during the drilling operation.

BACKGROUND OF THE INVENTION

Field of the invention

This invention relates to the drilling of wells into the earth's crust, and more particularly to new and improved pneumatic drilling operations in which subterranean formations penetrated by a well are treated in order to render them water-resistant.

DESCRIPTION OF THE PRIOR ART

Typically, wells are extended into the earth's crust to desired subterranean locations, e.g., oil and/or gas-bearing formations, through the application of rotary drilling techniques. In the rotary drilling of a well a drilling fluid is circulated through the well in order to remove the cuttings therefrom. This is accomplished by pumping the drilling fluid downwardly through a rotating drill string within the well and thence upwardly to the surface of the well through the annulus surrounding the drill string. The drill cuttings are entrained in the drilling fluid and withdrawn from the well with the fluid. In addition to removing cuttings, the drilling fluid also serves other functions such as cooling the bit.

In many rotary drilling procedures the drilling fluid is a liquid such as water or oil, either alone or in the form of a "mud," i.e., a water or oil-base liquid having suspended solids therein. Another rotary drilling technique which is becoming increasingly prevalent is pneumatic drilling in which a gaseous drilling fluid is used. Various advantages are attendant to the use of gas as a drilling fluid. For example, the gas is oftentimes much cheaper than the more conventional oil or water-base muds and, in addition, drilling usually can be accomplished at a much greater rate. In addition, the life of the drill bit often is prolonged and the likelihood of damaging a producing formation is reduced.

Although pneumatic drilling procedures have in many instances proven to be quite advantageous, considerable difficulties have been experienced due to the entry of water into the well during the drilling procedure. One problem is that the drill cuttings may tend to coagulate and stick to the drill pipe and to the wall of the well thus making removal of the cuttings from the well difficult. In addition to the coagulation of drill cuttings, another difficulty presented when water is encountered during pneumatic drilling operations is due to the deleterious effects of such water on the formations penetrated by the well. The water may enter the well in such amounts that an accumulation thereof remains in the bottom of the well causing a sloughing of the wall of the well at the drilling zone. Also, the water may be blown from the well out of the annulus and pass a region of the well susceptible to this condition, causing sloughing of the well wall at a point above the drilling zone.

Numerous techniques have been proposed for the purpose of alleviating the difficulties presented by such water intrusion. For example, as disclosed in U.S. Patent No. 3,155,178 to W. H. Kirkpatrick et al., it has been proposed to introduce waterproofing agents, such as calcium stearate, into the well in order to make the cuttings water-repellent so as to prevent their coagulation and gumming up within the well. Another procedure described in U.S. Patent No. 2,818,231 to W. A. Freeman, Jr., et al. involves the entrainment within the gaseous drilling fluid of a vaporized low-boiling organohalosilane such as trimethylchlorosilane. The organohalosilane, which may be dissolved in a relatively volatile solvent such as toluene, benzene, etc., is said to form a water-repellent surface on the wal of the well, thus minimizing entry of water into the well. In addition, the organohalosilanes are said to prevent coagulation of the cuttings within the well.

Another technique of combating water intrusion is through the introduction of a foaming agent with the gaseous drilling fluid. In this technique, an aqueous foam is formed whereby the water may be lifted to the surface of the well. For a further description of the use of foaming agents in pneumatic drilling, reference is made to the above-noted patent to Kirkpatrick et al. and also to B. V. Randall et al., "Stearates, Foaming Agents Combat Water in Air or Gas Drilling," The Oil and Gas Journal, Nov. 3, 1958, pp. 78–83.

SUMMARY OF THE INVENTION

In accordance with the present invention, there is provided a pneumatic drilling method in which one or more formations penetrated by a well are contacted by a foam of a hydrophobic liquid containing an oil-wetting surfactant. In carrying out the invention a gaseous drilling fluid is circulated through the well to remove drill cuttings from the well. A foam of a hydrophobic liquid containing an oil-wetting surfactant is entrained in the drilling fluid whereby the face of one or more formations exposed in the well is coated by the surfactant and liquid and rendered water-resistant. Preferably, the foam is introduced into the well in an amount such that a portion of such foam is withdrawn from the well with the circulated drilling fluid.

DESCRIPTION OF SPECIFIC EMBODIMENTS

In pneumatic rotary drilling a gaseous drilling fluid such as air, natural gas, or nitrogen is circulated through the well during the rotary drilling operation. The drilling fluid is compressed to a suitable delivery pressure, e.g., on the order of 100 p.s.i. or more, and introduced into the well via the rotating drill string. The gaseous drilling fluid flows downwardly through the drill string and outwardly into the well bore through outlet ports in the drill bit secured to the lower end of the drill string. The drilling fluid is introduced into the well under sufficient pressure and volume such that the drill cuttings are swept out of the drilling zone and lifted to the surface of the well through the annulus between the drill string and the wall of the well. At the surface of the well the gaseous drilling fluid with the cuttings entrained therein exits from the annulus through a conduit, commonly termed a "blooey" pipe, and is vented to the atmosphere.

When water is encountered during such drilling operations it tends to become at least partially entrained within the gaseous drilling fluid and is moved upwardly through the well within the annulus. Such water may act upon the formations penetrated by the well with certain deleterious effects. Typical of formations which may be adversely affected by the presence of water are the shales which contain hydratable clays. As the water contacts the face of a shale formation in the well, the formation tends to swell or fracture and ultimately may slough into the well, thus causing difficulties in the drilling operation. For example, the drill pipe may become stuck thus necessitating expensive fishing procedures. In more serious cases, there is even danger of losing the well through a destabilization of the well bore from a reaction of the entrained water with the formation minerals.

In practicing the present invention, one or more geological formations penetrated by the well are treated in conjunction with the pneumatic drilling operations in order to render such formation or formations resistant to water which may be entrained within the gaseous drilling fluid circulated up the annulus of the well. This is accomplished in the present invention by contacting the exposed formation face with a foam of a hydrophobic liquid containing an oil-wetting surfactant. As will be understood by those skilled in the art, by the term "oil-wetting surfactant," as used herein and in the appended claims, is meant a surface-active agent which has oleophilic characteristics and which upon adsorption on the exposed formation face within the well causes the face of the formation to be preferentially oil-wettable, i.e., more readily wetted by oil than by water. The oil-wetting surfactant which is adsorbed onto the face of the formation typically will form a monomolecular film in which an oleophilic hydrocarbon group is directed outwardly away from the solid surfaces of the formation. Thus, the surfactant adsorbed on the face of the formation exposed within the well renders it water-resistant.

As the oil-wetting surfactant is adsorbed on the formation surfaces, the face of the formation also is contacted by the hydrophobic liquid forming the foam. This liquid increases the water-resistant characteristics of the formation and provides for the retention of these characteristics for a prolonged period of time. In this regard, the hydrophobic liquid forms a protective film over the adsorbed oil-wetting surfactant and thus greatly reduces desorption of the surfactant from the formation face by water entrained in the gaseous drilling fluid.

The introduction of the hydrophobic liquid and surfactant into the well as a foam offers a number of advantages. The foam provides an excellent vehicle for transporting the liquid and surfactant down the well. In addition, the foam completely blocks the well annulus as it moves therethrough thus providing good contact with the formation surfaces. This is accomplished without significant increases in bottom hole pressure since the foam exerts a relatively low hydrostatic pressure.

The surfactant utilized in the present invention may be any agent, or a mixture of several compatible agents, which renders the exposed face of the subterranean formation preferentially oil-wettable. Illustrative of such surfactants are the higher alkyl quaternary ammonium salts having one or more long-chained alkyl groups. For example, the oil-wetting surfactant may be an alkyltrimethylammonium chloride or a dialkyldimethylammonium chloride in which the carbon chain length of the alkyl group or groups is from 8 to 18. Examples of commercially available alkyltrimethylammonium chlorides and dialkyldimethylammonium chlorides are Arquad–18 and Arquad–2HT–75, respectively, available from Armour Chemical Company.

Other suitable oil-wetting surfactants are the aliphatic polyethenoxy tertiary amines of the following general formula:

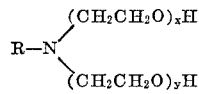

wherein:

R is an aliphatic group having from 12 to 18 carbon atoms, and x and y each are within the range of 1 to 5.

Examples of commercially available ethenoxylated amines of this group are Ethomeen C/12, Ethomeen 18/12, and Ethomeen S/12 by Armour Chemical Company. Substituted ammonium salts formed as the reaction products of these ethenoxylated tertiary amines with organic or inorganic acids also may be used. Of these, the products formed by reaction with the high molecular weight monobasic acids normally exhibit greater oil solubility than the corresponding tertiary amines and are particularly useful.

As a further example of oil-wetting surfactants which may be used are ethenoxylated tertiary diamines of the general formula:

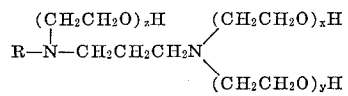

wherein:

R is an aliphatic group having a carbon chain length of 12 to 18, and x, y, and z each are within the range of 1 to 5.

A commercially available diamine of this type is Ethoduomeen T/13, available from Armour Chemical Company.

Additional oil-wetting surfactants which may be used in carrying out the invention are the polyvalent salts of the high molecular weight fatty acids such as palmitic, stearic, and oleic acid. Examples of such salts, commonly termed "heavy metal soaps," are aluminum oleate, zinc stearate and calcium stearate.

The hydrophobic liquid utilized in the present invention may be any material which will foam in the gaseous drilling fluid. Thus, the hydrophobic liquid may take the form of petroleum crude oil or gasoline, naphtha, kerosine, diesel oil, and other oleaginous products resulting from the refining of petroleum. Other liquids which may be used include carbon tetrachloride, trichloroethylene, and perchloroethylene. Also aqueous emulsions of the above-identified or other hydrophobic liquids in which the aqueous medium is in the dispersed phase may be used. Such emulsions, commonly called "inverted emulsions" are well known to those skilled in the art. It will be recognized that the above-designated surfactants and liquids are exemplary only and that other hydrophobic liquids and oil-wetting surfactants may be utilized in carrying out the invention.

Preferably, the hydrophobic liquid used in forming the foam is substantially nonvolatile such that it exhibits a low volatility within the well bore. This will result in a relatively stable film over the formation surface which is not subject to extensive evaporation in the presence of the gaseous drilling fluid circulating through the annulus. By the term "substantially nonvolatile," as used herein and in the appended claims, is meant a liquid having a boiling point or average boiling point in excess of 300° F. at atmospheric pressure. Thus, the above-quoted term includes a liquid such as crude oil having low boiling constituents so long as it is formed predominantly of constituents exhibiting boiling points above 300° F. Exemplary of hydrophobic, substantially nonvolatile liquids which may be used in carrying out the invention are petroleum crude oils or various relatively high boiling point cuts thereof such as diesel oil. Inverted emulsions of such oils in which the oil is in the continuous phase also may be used.

The hydrophobic liquid foam may be introduced into the well by any suitable technique. In conventional pneumatic drilling techniques the gaseous drilling fluid is circulated into the drill string through an element in the drill string support system, termed a "swivel." In carrying out the present invention the hydrophobic liquid containing the oil-wetting surfactant may be introduced into the gaseous stream flowing to the swivel. The hydrophobic liquid may be introduced into the gaseous drilling fluid under conditions of violent agitation in order to promote the formation of a foam.

In some cases, particularly where the oil-wetting surfactant contained therein is soluble in the hydrophobic liquid, the introduction of the hydrophobic liquid as defined above may suffice to produce a foam in the gaseous drilling fluid. However, even then, the foam if formed will normally tend to be relatively unstable. In order to ensure that a foam is produced and also to ensure that the foam once produced remains stable, as it is circulated through the well, it is preferred to include in the hydrophobic liquid a foam-stabilizing agent. Foaming agents which may be used include finely dispersed particles of bentonite or other clays which have been rendered oleophilic by suitable treatment. For example, the foaming agent may take the form of finely divided bentonite which has been treated by a cationic, surface-active agent such as Arquad–2HT–75. Other foam-stabilizing agents, such as carbon black, may be used to advantage in the present invention.

The concentration of the oil-wetting surfactant in the hydrophobic liquid foam may vary widely depending upon the nature of the well under treatment and the type of surfactant used. In general, however, it will be desirable to incorporate the surfactant within the hydrophobic liquid in a concentration within the range ½ to 40 pounds of surfactant per 100 gallons of hydrophobic liquid. In any case, the concentration of the oil-wetting surfactant in the liquid should be such that a substantial excess of liquid is provided in order to provide an adequate coating of liquid over the surfactant film adsorbed on the formation surfaces. This will prevent unacceptably high desorption of the surfactant from the exposed formation face by water which may be entrained in the gaseous drilling fluid.

The surfactant may be mixed with the hydrophobic liquid to form either a solution or dispersion in the hydrophobic liquid depending upon the solubility characteristics of the surfactant. For example, the quaternary ammonium salts such as described above are water-soluble, oil-dispersible compounds and may be incorporated in the hydrophobic liquid as dispersions. The above-described ethenoxylated amines vary from oil to water solubility and may be dissolved or dispersed in the hydrophobic liquid as indicated.

While the foam may be continuously entrained in the drilling fluid as drilling of the well proceeds through troublesome formations, it normally will be preferred to introduce the foam intermittently. The frequency of the repetitive foam treatments may vary from well to well depending upon local conditions. It is desirable to inject the foam in adequate quantities and as sufficient intervals in order to ensure coverage of the open hole not covered by the preceding foaom treatment. As a general rule, it is preferred to repeat the foam treatments at intervals such that foam is injected once for each 30 to 90 feet of well drilled. The total volume of hydrophobic liquid and oil-wetting surfactant used for each foaming treatment desirably is within the range of ½ to 5 barrels depending upon local factors such as well diameter and depth, the gas flow rate and the amount of water entering the well bore from the formations penetrated.

A preferred technique for ensuring that adequate amounts of the hydrophobic liquid and surfactant are used is to introduce these agents into the drilling fluid in amounts such that portions of them are returned to the surface with the gaseous drilling fluid circulated through the annulus. This normally will ensure that adequate amounts of treating agents are used to provide sufficient coverage for the wall of the well. Desirably, the liquid and surfactant are produced from the blooey line as a foam, thus ensuring that the injected foam remained stable as it was circulated through the well.

In most cases, the use of the aforementioned surfactant-hydrophobic liquid mixture will impart adequate water-resistant properties to the formations penetrated by the well. However, in some instances it may be desired to impart even greater water-resistant characteristics to such formations, particularly in those instances where unusually large amounts of water are encountered during drilling operations. In this case, it is preferred to add asphalt to the hydrophobic liquid-surfactant mixture from which the foam is formed. Such asphalt may be the residual bitumens obtained from the refining of petroleum crude oils. Also, the so-called "blown asphalts" may be utilized. As will be understood by those skilled in the art, by the term "blown asphalt" is meant asphaltic bitumens which have undergone an oxidative treatment by being exposed to air, oxygen, or some other oxidative environment, usually at elevated temperatures. The concentration of asphalt in the hydrophobic liquid will depend to a large extent on local conditions encountered in the well being drilled. A preferred concentration of asphalt is within the range of 10 to 100 pounds of asphalt per 100 gallons of hydrophobic liquid. Usually, it will be desirable to avoid using more than 125 pounds of asphalt per 100 gallons of diesel oil or other hydrophobic liquid.

Having described specific embodiments of the instant invention, it will be understood that further modifications thereof may be suggested to those skilled in the art, and it is intended to cover all such modifications as fall within the scope of the appended claims.

We claim:
1. In the pneumatic drilling of a well penetrating a subterranean formation, the method comprising:
   circulating a predominantly gaseous drilling fluid through said well by introducing said drilling fluid into said well and into contact with said formation and withdrawing said drilling fluid from said well to remove cuttings therefrom, and
   entraining a foam of a hydrophobic liquid containing and oil-wetting surfactant in said drilling fluid whereby the face of said formation exposed in said well is coated by said surfactant and said liquid and rendered water-resistant.

2. The method of claim 1, wherein said foam is intermittently entrained in said drilling fluid at drilling intervals within the range of 30 to 90 feet.

3. The method of claim 2, wherein the volume of hydrophobic liquid and oil-wetting surfactant used in said foam is within the range of ½ to 5 barrels.

4. The method of claim 1, further comprising withdrawing a portion of said hydrophobic liquid and said oil-wetting surfactant from said well with said drilling fluid.

5. The method of claim 4, wherein said hydrophobic liquid and said oil-wetting surfactant are withdrawn from said well as a foam.

6. The method of claim 1, wherein said hydrophobic liquid is predominantly nonvolatile.

7. The method of claim 1, wherein said hydrophobic liquid contains asphalt.

References Cited

UNITED STATES PATENTS

| | | | |
|---|---|---|---|
| 2,773,670 | 12/1965 | Miller | 166—30 X |
| 2,818,231 | 12/1957 | Freeman et al. | 175—68 |
| 3,065,791 | 11/1962 | Bearden et al. | 175—71 X |
| 3,141,503 | 7/1964 | Stein | 166—29 |
| 3,155,178 | 11/1964 | Kirkpatrick et al. | 175—69 |
| 3,240,280 | 3/1966 | Stratton et al. | 175—71 |
| 3,323,593 | 6/1967 | Foshee et al. | 175—69 X |
| 3,394,758 | 7/1968 | Terry et al. | 175—71 X |

STEPHEN J. NOVOSAD, Primary Examiner

U.S. Cl. X.R.
166—294; 175—68